(12) United States Patent
Dellock et al.

(10) Patent No.: US 9,937,855 B2
(45) Date of Patent: Apr. 10, 2018

(54) AUTOMOTIVE WINDOW GLAZINGS

(71) Applicant: Ford Global Technologies, LLC, Dearborn, MI (US)

(72) Inventors: Paul Kenneth Dellock, Northville, MI (US); David Brian Glickman, Southfield, MI (US); Stuart C. Salter, White Lake, MI (US); Talat Karmo, Waterford, MI (US); Tom Boettger, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 15/171,195

(22) Filed: Jun. 2, 2016

(65) Prior Publication Data

US 2017/0349090 A1 Dec. 7, 2017

(51) Int. Cl.
| | |
|---|---|
| *B60Q 1/26* | (2006.01) |
| *B60J 1/00* | (2006.01) |
| *E06B 7/00* | (2006.01) |
| *F21V 9/16* | (2006.01) |
| *B60R 13/08* | (2006.01) |
| *F21W 121/00* | (2006.01) |
| *F21Y 101/02* | (2006.01) |

(52) U.S. Cl.
CPC ............. *B60Q 1/268* (2013.01); *B60J 1/00* (2013.01); *B60R 13/08* (2013.01); *E06B 7/00* (2013.01); *F21V 9/16* (2013.01); *F21W 2121/00* (2013.01); *F21Y 2101/02* (2013.01)

(58) Field of Classification Search
CPC .... B60J 1/00; B60J 1/20; B60Q 1/268; B60R 13/08; E06B 7/00; F21V 9/16

USPC .................. 362/487–488, 503–504, 509–511
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,093,278 A | 7/2000 | Wade |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,720,065 B1 | 4/2004 | Cosentino |
| 6,729,738 B2 | 5/2004 | Thompson et al. |
| 6,737,964 B2 | 5/2004 | Samman et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP (57) ABSTRACT

A vehicle window glazing is provided that includes a transparent substrate defining a first surface with a decorative layer positioned on the first surface defining an indicium. A light source is positioned on the decorative layer. A conductive lead is electrically coupled to the light source and extends along the first surface of the substrate away from the light source. The at least one conductive lead is substantially transparent and a transparent layer is positioned over the decorative layer and substrate.

20 Claims, 9 Drawing Sheets

(56) References Cited

U.S. PATENT DOCUMENTS

| | | |
|---|---|---|
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,236,383 B2 | 8/2012 | Gasworth et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formosa |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0287028 A1 | 12/2007 | Hedderich et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0268931 A1 | 11/2011 | van Der Meulen et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

AUTOMOTIVE WINDOW GLAZINGS

FIELD OF THE INVENTION

The present invention generally relates to vehicle decorative features, and, more particularly, relates to automotive glazings incorporating decorative features.

BACKGROUND OF THE INVENTION

Decorative features of vehicles offer a unique and attractive viewing experience. It is therefore desired to implement such structures in automotive vehicles for various glazing applications.

SUMMARY OF THE INVENTION

According to one aspect of the present invention, a vehicle window glazing is provided that includes a transparent substrate defining a first surface with a decorative layer positioned on the first surface defining an indicium. A light source is positioned on the decorative layer. A conductive lead is electrically coupled to the light source and extends along the first surface of the substrate away from the light source. The at least one conductive lead is substantially transparent and a transparent layer is positioned over the decorative layer and substrate.

According to another aspect of the present invention, a vehicle window glazing is provided that includes a substantially transparent substrate defining a first surface and a second surface. A decorative layer is positioned on the first surface. The decorative layer defines an indicium which is raised relative to the decorative layer. A first silicone layer is positioned over the decorative layer and the first surface of the substrate and a second silicone layer is positioned over the second surface.

According to another aspect of the present invention, a vehicle window glazing is provided that includes a substantially transparent substrate defining a first surface and a second surface. A decorative layer is positioned on the first surface. The decorative layer defines an indicium which is raised relative to the decorative layer. A phosphorescent layer is positioned between the decorative layer and the substrate.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows, and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
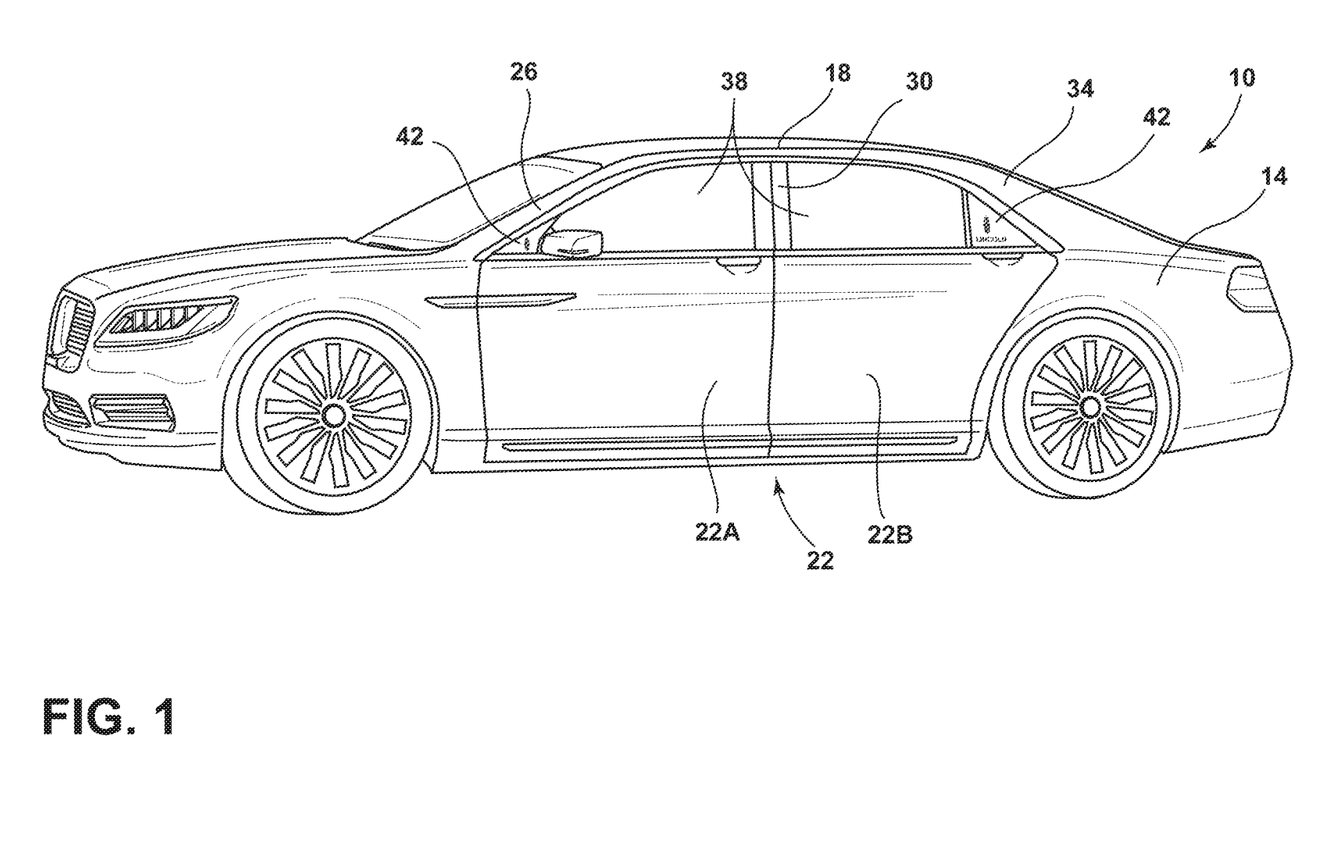
FIG. 1 is a side perspective view of a vehicle having a vehicle window glazing, according to one embodiment.

Referring to FIG. 1, reference numeral 10 generally designates a vehicle. The vehicle 10 includes a body 14 and a roof 18. The body 14 includes a plurality of doors 22. The doors 22 include a driver door 22A and a rear passenger door 22B. The vehicle includes an A-pillar 26, a B-pillar 30 and a C-pillar 34. The pillars 26, 30 and 34 are separated by the doors 22. Each of the doors 22 includes a window 38. The window 38 may be made of a glass or other substantially transparent material. Disposed in positions proximate the A-pillar 26 and the C-pillar 34 are quarter windows 42. The quarter windows 42 may be stationary (e.g., always closed) or openable. In the depicted example, the quarter windows 42 are in contact with the A-pillar 26 and the C-pillar 34, however, in other examples, the quarter windows 42 may be positioned within the A-pillar 26, B-pillar 30 or C-pillar 34 (i.e., as opera windows). In examples utilizing the quarter window 42 proximate the A-pillar 26, the quarter window 42 may be disposed vehicle forward of the driver door 22A or extend from the driver door 22A. Similarly, in examples where the quarter window 42 is proximate the C-pillar 34, the quarter window 42 may be positioned behind, or vehicle rearward, of the rear passenger door 22B, or extend therefrom.

Figure 2:
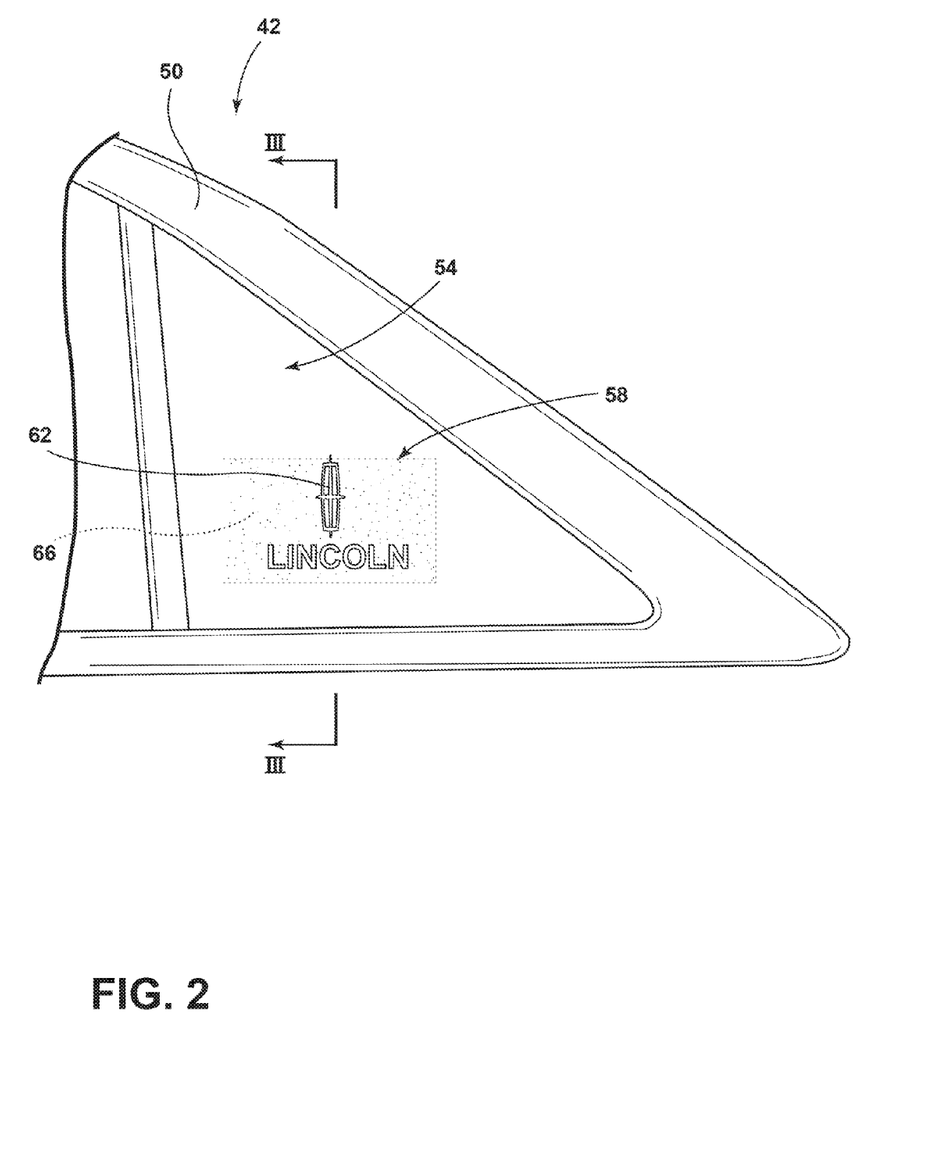
FIG. 2 is front elevational view of the automotive vehicle window glazing, according to one embodiment.

Referring now to FIG. 2, the quarter window 42 is surrounded by a seal 50. The seal 50 may be composed of a polymeric material configured to provide a weather tight (e.g., rain and air resistant) seal between the quarter window 42, the windows 38 (FIG. 1) and the pillars 26, 30 and 34 (FIG. 1). The seal 50 extends around the quarter window 42 such that a viewing area 54 is defined in a central portion of the quarter window 42. The viewing area 54 may be substantially transparent such that occupants within the vehicle 10, and observers exterior to the vehicle 10, may see through the quarter window 42 to an opposite side. Positioned within the viewing area 54 of the quarter window 42 may be a decorative layer 58. As explained in greater detail below, the decorative layer 58 may define one or more indicia 62. The indicia 62 may be raised or lowered relative to a flat portion 66 of the decorative layer 58. The decorative layer 58 may be substantially transparent, substantially translucent or opaque such that the indicia 62 are visible to the observers and the occupants. In a specific example, just the indicia 62 may be opaque while the flat portion 66 is translucent and/or clear. The decorative layer 58 may be a polymer, a metal (e.g., a metallic foil) and/or a vacuum metalized surface.

Figure 3:
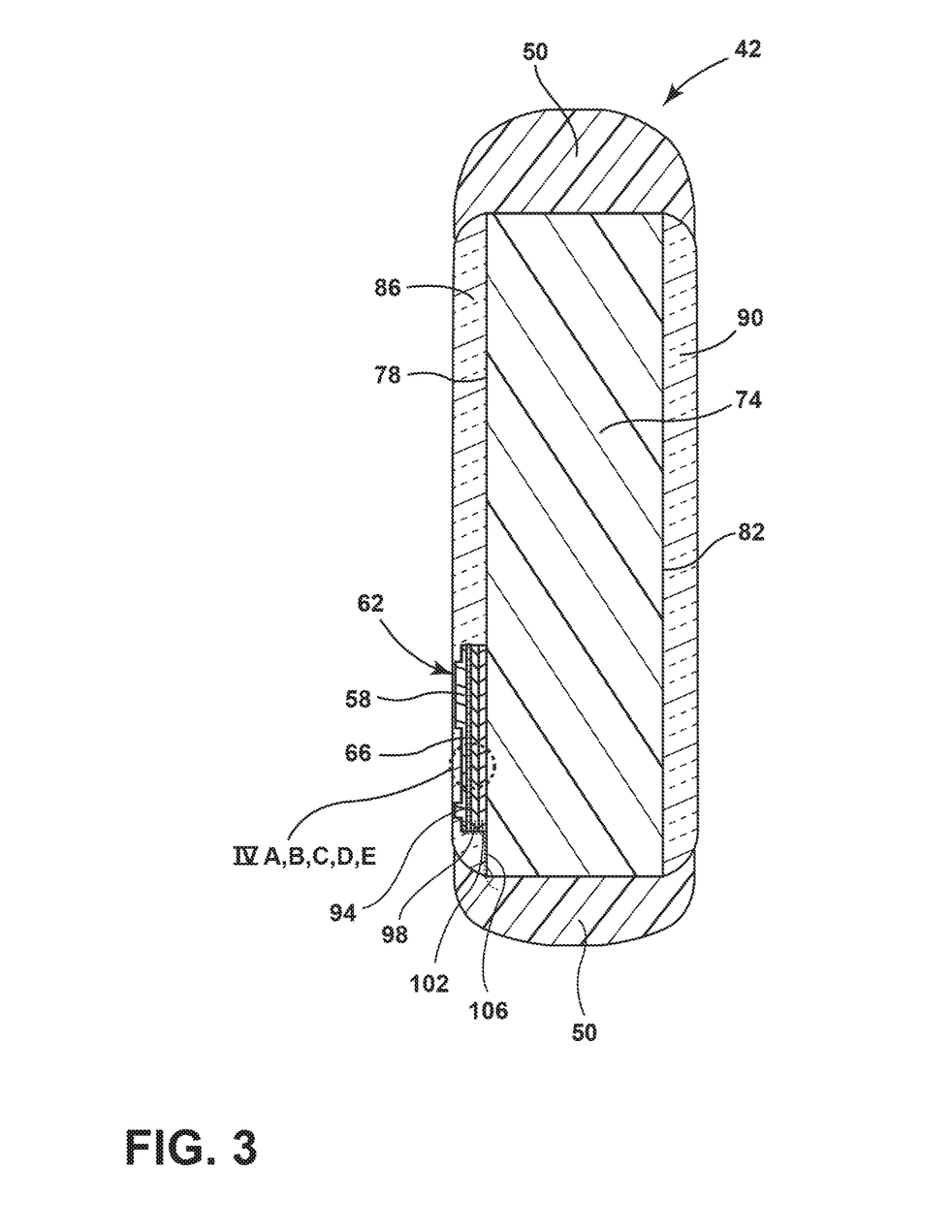
FIG. 3 is a cross-sectional view taken at line of FIG. 2, according to one embodiment.

Referring now to FIG. 3, the quarter window 42 includes a window substrate 74 which defines a first surface 78 and a second surface 82. The window substrate 74 may be composed of an optically clear polymer (e.g., acrylic, polycarbonate, a liquid crystal polymer, cyclo-olefin copolymer, etc.). The window substrate 74 may include a colorant (e.g., to color or filter the light passing through the quarter window 42), an ultra violet inhibitor or blocker (e.g., a hindered amine or benzoyl), or infrared blocking material (e.g., aluminosilicates and/or metal oxides). In the depicted example, the first surface 78 may be an exterior side (i.e., outboard) and the second surface 82 may be an interior side (i.e., inboard) relative to the vehicle 10. The window substrate 74 may be between about 1.0 mm and about 12.0 mm, or between about 2.0 mm and about 6.0 mm thick from the first surface 78 to the second surface 82.

Positioned on the first surface 78 may be a first polymeric layer 86 and disposed on the second surface 82 may be a second polymeric layer 90. The first and second polymeric layers 86, 90 may have a transparency to light in a visible spectrum (e.g., about 400 nm to about 700 nm) of greater than about 50%, 60%, 70%, 80%, 90% or 99%. The first and second polymeric layers 86, 90 may be composed of the same polymeric material or a different polymeric material. For example, the first and second polymeric layers 86, 90 may be composed of silicone, polyisoprene, polybutadiene, chloroprene, butyl rubber, nitrile rubber, fluorosilicate, fluoroelastomers, ethylene vinyl acetate, other soft polymeric materials and/or combinations thereof. The first and second polymeric layers 86, 90 may have a thickness of between about 0.01 mm to about 10.0 mm, or between about 0.25 mm to about 0.5 mm. In silicone examples of the first and second polymeric layers 86, 90, the first and second polymeric layers 86, 90 may have a density of about 1150 kg/m². Use of the first and second polymeric layers 86, 90 may allow for the dampening or reduction of acoustical energy through the quarter windows 42. For example, use of the first and second polymeric layers 86, 90 on the substrate 74 may allow for an acoustic power reduction of greater than about 1 dB, 5 dB, 10 dB, or greater than 20 dB. In some examples, the first and/or second polymeric layers 86, 90 may include a colorant (e.g., to color or filter the light passing through the quarter window 42), an ultra violet inhibitor or blocker (e.g., a hindered amine or benzoyl), or infrared blocking material (e.g., aluminosilicates and/or metal oxides). Further, use of the first and second polymeric layers 86, 90 provides a protective layer to the quarter windows 42 which may create a slick and hydrophobic surface which may repel rain, oils and/or road grime which will allow the quarter windows 42 to stay cleaner. The first and second polymeric layers 89, 90 may have a viscoelasticity (i.e., having both viscosity and elasticity), a low Young's modulus, and/or a high failure strain compared with other materials, so that the first and second polymeric layers 89, 90 may protect the quarter windows 42 when contact is made thereto (i.e., to prevent scratches, protect against impact, reduce vibration, etc.).

The first and second polymeric layers 86, 90 may be formed by over-molding the window substrate 74 and/or the quarter window 42 using a liquid polymer. The over-molding liquid polymer may have a viscosity of less than about 2000 pa·s, less than about 1000 pa·s, or less than about 100 pa·s when over-molded onto the window substrate 74 and/or the quarter window 42. Preferably, forming the first and second polymeric layers 86, 90 is performed using an injection molding process. The liquid polymer may then be solidified to form the first and second polymeric layers 86, 90.

The decorative layer 58 may be positioned in a stack of materials/structures on the first surface 78 of the window substrate 74. In the depicted example, the decorative layer 58 is positioned on top of a phosphorescent layer 94, a light assembly 98 and an adhesive layer 102. It will be understood that although described in connection with the first surface 78, the decorative layer 58, the phosphorescent layer 94, the light assembly 98 and the adhesive layer 102 may be positioned on the second surface 82 of the window substrate 74 without departing from the teachings provided herein. The adhesive layer 102 may be used to secure the decorative layer 58 and/or the light assembly 98 in place during formation of the first and second polymeric layers 86, 90. It will be understood that the decorative layer 58, the phosphorescent layer 94, the light assembly 98 and the adhesive layer 102 may be positioned on different surfaces (e.g., the decorative layer 58 and the phosphorescent layer 94 on the first surface 78 and the light assembly 98 on the second surface 82, each being secured to the window substrate 74 by an adhesive layer 102) without departing from the teachings provided herein. The adhesive layer 102 may be a clear pressure sensitive adhesive. It will be understood that the adhesive layer 102 is optional.

The decorative layer 58, as explained above, defines both the indicia 62 and the flat portion 66. The indicia 62 may be embossed, textured, engraved, or otherwise modified in thickness to produce the indicia 62. The indicia 62 may be raised or lowered relative to the flat portion 66 of the decorative layer 58. The indicia 62 may include a symbol, alpha numeric text, a picture, a number, or a combination thereof. The decorative layer 58 may define one or more discrete indicia 62 (e.g., multiple separate indicia 62 spaced across the flat portion 66). The decorative layer 58 may be a polymeric material, a metal, or combinations thereof. In some examples, the decorative layer 58 may be a metal or metallic foil. In metallic examples of the decorative layer 58, the decorative layer may have a luster or shine configured to reflect light. In polymeric examples of the decorative layer 58, the decorative layer 58 may have a vacuumized metal surface configured to reflect light. The decorative layer 58 may be painted, or otherwise colored or dyed, to produce aesthetically pleasing colors.

Electrically coupled to the light-producing assembly 98 and extending across the first surface 78 of the substrate 74 is at least one conductive lead 106. The at least one conductive lead 106 is electrically coupled with the light assembly 98. The conductive lead 106 extends across the first surface 78 of the substrate 74 toward the seal 50. The conductive lead 106 may be electrically coupled with a power source or electrical system of the vehicle 10 (FIG. 1). In a specific example, there may be two conductive leads 106 (e.g., positive and negative polarity). The conductive leads 106 may extend parallel to one another, or may extend in opposite directions from one another. The conductive leads 106 may be transparent such that observers of the quarter windows 42 may not see the leads 106. The conductive leads 106 may include a transparent conductive oxide (e.g., indium tin oxide), transparent nanowires (e.g., single nanowires or in a mesh), other transparent conductive materials and/or combinations thereof.

Still referring to FIG. 3, the phosphorescent layer 94 may be prepared by dispersing one or more persistent phosphorescent materials in a polymer matrix to form a homogenous mixture using a variety of methods. For example, the phosphorescent layer 94 may be rendered by dispersing the phosphorescent materials into a solid state solution (homogenous mixture in a dry state) that may be incorporated in a polymer matrix formed by extrusion, injection molding, compression molding, calendaring, thermoforming, etc. Additionally or alternatively, a phosphorescent structure may be disposed on an exterior surface of the decorative layer 58 which may incorporate the phosphorescent materials and be applied by painting, screen printing, flexography, spraying, slot coating, dip coating, roller coating, bar coating, and/or any other methods known in the art.

The persistent phosphorescent materials may be defined as being able to store an activation emission and release light gradually (i.e., a perceptible glow), for a period of several minutes or hours, once the activation emission is no longer present. The decay time may be defined as the time between the end of excitation from the activation emission and the moment when the light intensity of the phosphorescent structure drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The persistent phosphorescent material, according to one embodiment, may be operable to emit light at or above an intensity of 0.32 mcd/m$^2$ after a period of 10 minutes. Additionally, the persistent phosphorescent material may be operable to emit light above or at an intensity of 0.32 mcd/m$^2$ after a period greater than 30 minutes, greater than 60 minutes, greater than 2 hours, greater than 5 hours, greater than 10 hours or greater than 24 hours. Accordingly, the persistent phosphorescent material may continually illuminate in response to excitation through a plurality of excitation sources emitting an activation emission, including, but not limited to, ambient light (e.g., the sun), light from the light assembly 98, and light sources located within the interior of vehicle 10. The periodic absorption of the activation emission from the excitation sources may provide for a substantially sustained charge of the persistent phosphorescent materials to provide for a consistent passive illumination. For example, the lighting assembly 98 may be pulsed, or otherwise periodically activated to charge the phosphorescent materials, such that the decorative layer 58 provides a constant or changing level of emitted phosphorescent light. In some embodiments, a light sensor may monitor the light illumination intensity of the phosphorescent material and initiate an excitation source (e.g., light from the light assembly 98) when the illumination intensity falls below 0.32 mcd/m$^2$, or any other predefined intensity level.

In examples where the light assembly 98 is configured to charge the phosphorescent materials, the light assembly 98 may incorporate one or more blue, ultraviolet or high blue content (e.g., greater than about 10%, 20%, 30%, 40%, 50%, 60%, 70%, 80% or 90% of the emitted light is blue) light sources (e.g., light bulb and/or light emitting diode). In examples where the light is colored, an optically transparent portion may be formed on the light assembly 98 such that blue light may reach the phosphorescent materials and not be filtered out.

The persistent phosphorescent materials may correspond to alkaline earth aluminates and silicates, for example, doped di-silicates, or any other compound that is capable of emitting light for a period of time once an activation emission is no longer present. The persistent phosphorescent materials may be doped with one or more ions, which may correspond to rare earth elements, for example, Eu2+, Tb3+ and Dy3+. The polymeric material of the phosphorescent layer 94 may include between about 0.1% to about 25.0% of the persistent phosphorescent material either by weight or mole fraction. In embodiments utilizing the phosphorescent material on a viewing side of the decorative layer 58, the decorative layer 58 may have the phosphorescent material applied having phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The phosphorescent material, according to one embodiment, may be a translucent white color when unilluminated. Once the phosphorescent material receives the activation emission of a particular wavelength, the phosphorescent material may emit white light, blue light, red light, green light or combinations thereof therefrom. The light emitted from the phosphorescent material, and, thereby, the indicia 62 and/or the flat portion 66 of the decorative layer 58 may have a sufficient brightness such that the decorative layer 58 is visible. According to one embodiment, the blue emitting phosphorescent material may be $Li_2ZnGeO_4$ and may be prepared by a high temperature solid-state reaction method or through any other practicable method and/or process. The blue afterglow may last for a duration of two to eight hours and may originate from an activation emission and d-d transitions of $Mn^{2+}$ ions.

According to an alternate exemplary embodiment, 100 parts of a commercial solvent-borne polyurethane, such as Mace resin 107-268, having 50% solid polyurethane in Toluene/Isopropanol, 125 parts of a blue green long persistent phosphor, such as Performance Indicator PI-BG20, and 12.5 parts of a dye solution containing 0.1% Lumogen Yellow F083 in dioxolane may be blended to yield a low rare earth mineral phosphorescent structure or be used in the phosphorescent layer 94. It will be understood that the compositions provided herein are non-limiting examples. Thus, any phosphor known in the art may be utilized as the phosphorescent material or structure without departing from the teachings provided herein. Moreover, it is contemplated that any long persistent phosphor known in the art may also be utilized without departing from the teachings provided herein.

Additional information regarding the production of long persistence luminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," issued Feb. 10, 2015, all of which are incorporated herein by reference in their entirety.

Additionally or alternatively, the phosphorescent layer 94 may be mixed with or include a structure including one or more photoluminescent materials. Such photoluminescent materials may have energy converting elements with phosphorescent or fluorescent properties. For example, the photoluminescent material may include organic or inorganic fluorescent dyes including rylenes, xanthenes, porphyrins, and phthalocyanines, or combinations thereof. Additionally or alternatively, the photoluminescent material may include phosphors from the group of Ce-doped garnets such as YAG:Ce. The photoluminescent material may be formulated to have a Stokes shift resulting in the conversion of visible or non-visible light into visible light having an emission spectrum expressed in a desired color, which may vary per lighting application. Such photoluminescent material may have a limited persistence (e.g., less than about 10 minutes, less than about 5 minutes, less than about 1 minute or no human perceivable persistence).

Figure 4A:
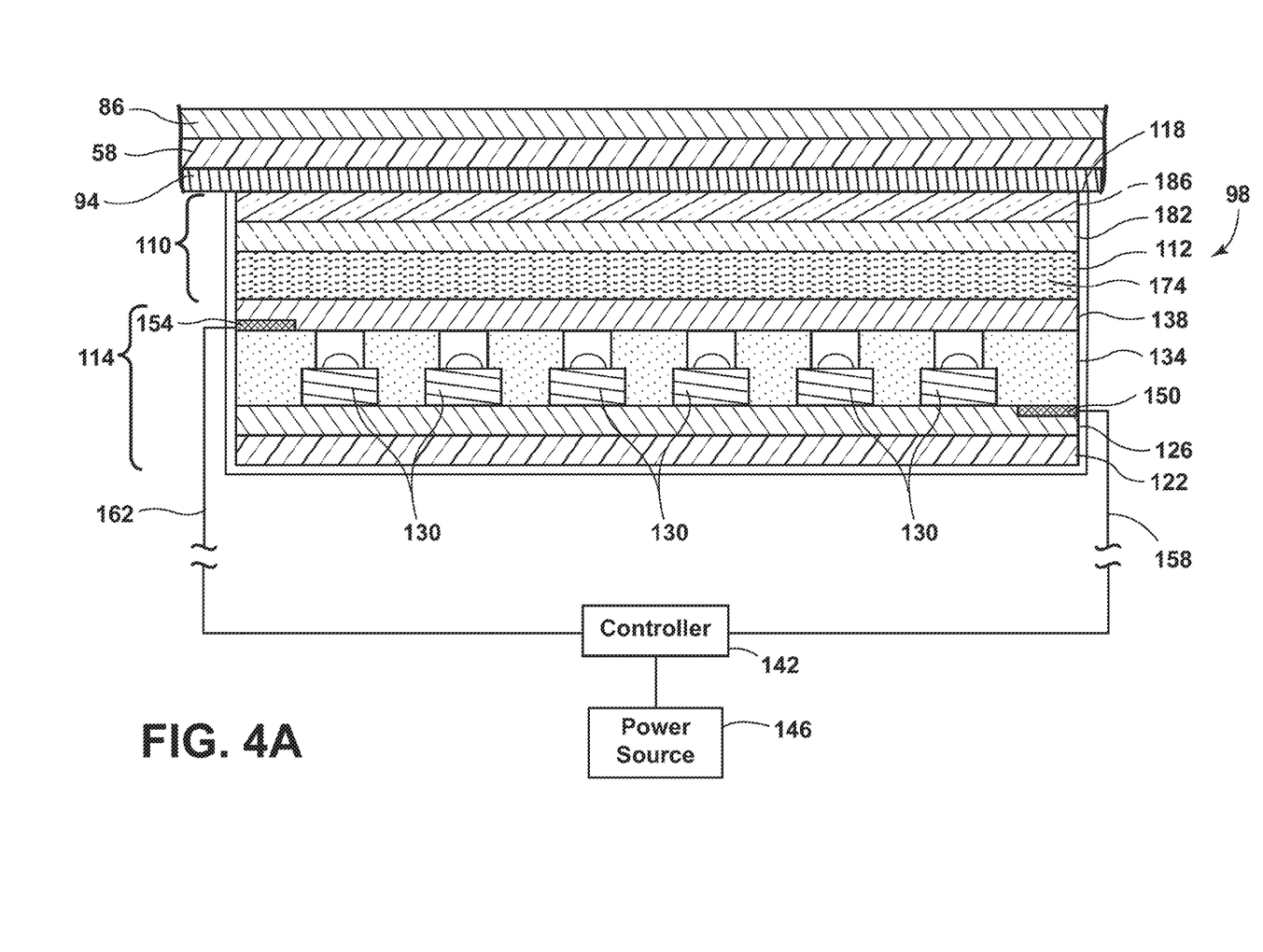
FIG. 4A is an enlarged cross-sectional view taken at section IV of FIG. 3 illustrating a light assembly according to one embodiment.

Referring to FIGS. 4A-4E, the light assembly 98 capable of use on the vehicle 10 of FIG. 1 with the external photoluminescent structure 110 and phosphorescent structure 94 is shown, according to various embodiments. As illustrated in FIG. 4A, the light assembly 98 may have a stacked arrangement that includes a light-producing assembly 114 and the photoluminescent structure 110.

The light-producing assembly 114 may correspond to a thin-film or printed light emitting diode (LED) assembly and includes a substrate 122 as its lowermost layer. The substrate 122 may include a polycarbonate, poly-methyl methacrylate (PMMA), or polyethylene terephthalate (PET) material on the order of 0.005 to 0.060 inches thick and is arranged over the intended vehicle substrate on which the light assembly 98 is to be received (e.g., the window substrate 74 of FIG. 3). Alternatively, as a cost saving measure, the substrate 122 may directly correspond to a preexisting structure (e.g., window substrate 74).

The light-producing assembly 114 includes a positive electrode 126 arranged over the substrate 122. The positive electrode 126 includes a conductive epoxy such as, but not limited to, a silver-containing or copper-containing epoxy. The positive electrode 126 is electrically connected to at least a portion of a plurality of LED sources 130 arranged within a semiconductor ink 134 and applied over the positive electrode 126. Likewise, a negative electrode 138 is also electrically connected to at least a portion of the LED sources 130. The negative electrode 138 is arranged over the semiconductor ink 134 and includes a transparent or translucent conductive material such as, but not limited to, indium tin oxide. Additionally, each of the positive and negative electrodes 126, 138 are electrically connected to a controller 142 and a power source 146 via a corresponding bus bar 150, 154 and conductive elements 158, 162 (e.g., the conductive leads 106 of FIG. 3). The bus bars 150, 154 may be printed along opposite edges of the positive and negative electrodes 126, 138 and the points of connection between the bus bars 150, 154 and the conductive leads 158, 162 may be at opposite corners of each bus bar 150, 154 to promote uniform current distribution along the bus bars 150, 154. It should be appreciated that in alternate embodiments, the orientation of components within the light-producing assembly 114 may be altered without departing from the concepts of the present disclosure. For example, the negative electrode 138 may be disposed below the semiconductor ink 134 and the positive electrode 126 may be arranged over the aforementioned semiconductor ink 134. Likewise, additional components, such as the bus bars 150, 154, may also be placed in any orientation such that the light-producing assembly 114 may emit outputted light 166 (FIG. 4B) toward a desired location.

The LED sources 130 may be dispersed in a random or controlled fashion within the semiconductor ink 134 and may be configured to emit focused or non-focused light toward the photoluminescent structure 110. The LED sources 130 may correspond to micro-LEDs of gallium nitride elements on the order of about 5 to about 400 microns in size and the semiconductor ink 134 may include various binders and dielectric material including, but not limited to, one or more of gallium, indium, silicon carbide, phosphorous, and/or translucent polymeric binders.

The semiconductor ink 134 can be applied through various printing processes, including ink jet and silk screen processes, to selected portion(s) of the positive electrode 126. More specifically, it is envisioned that the LED sources 130 are dispersed within the semiconductor ink 134, and shaped and sized such that a substantial quantity of the LED sources 130 align with the positive and negative electrodes 126, 138 during deposition of the semiconductor ink 134. The portion of the LED sources 130 that ultimately are electrically connected to the positive and negative electrodes 126, 138 may be illuminated by a combination of the bus bars 150, 154, controller 142, power source 146, and conductive leads 158, 162. According to one embodiment, the power source 146 may correspond to a vehicular power source 146 operating at 12 to 16 VDC. Additional information regarding the construction of light-producing assemblies 114 is disclosed in U.S. Patent Publication No. 2014/0264396 A1 to Lowenthal et al. entitled "ULTRA-THIN PRINTED LED LAYER REMOVED FROM SUBSTRATE," filed Mar. 12, 2014, the entire disclosure of which is incorporated herein by reference.

Referring now to FIG. 4A, the photoluminescent structure 110 is arranged over the negative electrode 138 as a coating, layer, film or other suitable deposition. With respect to the presently illustrated embodiment, the photoluminescent structure 110 may be arranged as a multi-layered structure, including an energy conversion layer 112, optional stability layer 182, and optional protective layer 186, as described above.

The decorative layer 58 is arranged over the photoluminescent structure 110. In some embodiments, the decorative layer 58 is molded over the photoluminescent structure 110 and light-producing assembly 114. As explained above, the decorative layer 58 may be at least partially light transmissible. In this manner, the decorative layer 58 will be illuminated by the photoluminescent structure 110 whenever an energy conversion process is underway.

An overmold material 118 is disposed around the light-producing assembly 114 and/or photoluminescent structure 110. The overmold material 118 may protect the light-producing assembly 114 from physical and chemical damage arising from environmental exposure. The overmold material 118 may have viscoelasticity (i.e., having both viscosity and elasticity), a low Young's modulus, and/or a high failure strain, compared with other materials, so that the overmold material 118 may protect the light-producing assembly 114 when contact is made thereto. For example, the overmold material 118 may protect the light-producing assembly 114 from the environmental containments, such as dirt and water, which may come in contact with the light assembly 98 during manufacturing.

In some embodiments, the photoluminescent structure 110 may be employed separate and away from the light-producing assembly 114. For example, the photoluminescent structure 110 may be positioned on a vehicle interior side of the decorative layer 58 (FIG. 3) (e.g., on the second surface 82 of the window substrate 74), another location of the quarter window 42 (FIG. 3), the seal 50 (FIG. 3) and/or any surface proximate, but not in physical contact with, the light-producing assembly 114. It will be understood that the photoluminescent structure 110 may be positioned on the first surface 78 of the window substrate 74, and the light-producing assembly 114 positioned on the second surface 82 of the window substrate 74 (see FIG. 3), without departing from the teachings provided herein. It will also be understood that in embodiments where the photoluminescent structure 110 is incorporated into distinct components separated from the light assembly 98, the light assembly 98 might still have the same or similar structure to the light assembly 98 described in reference to FIG. 4A.

Figure 4B:
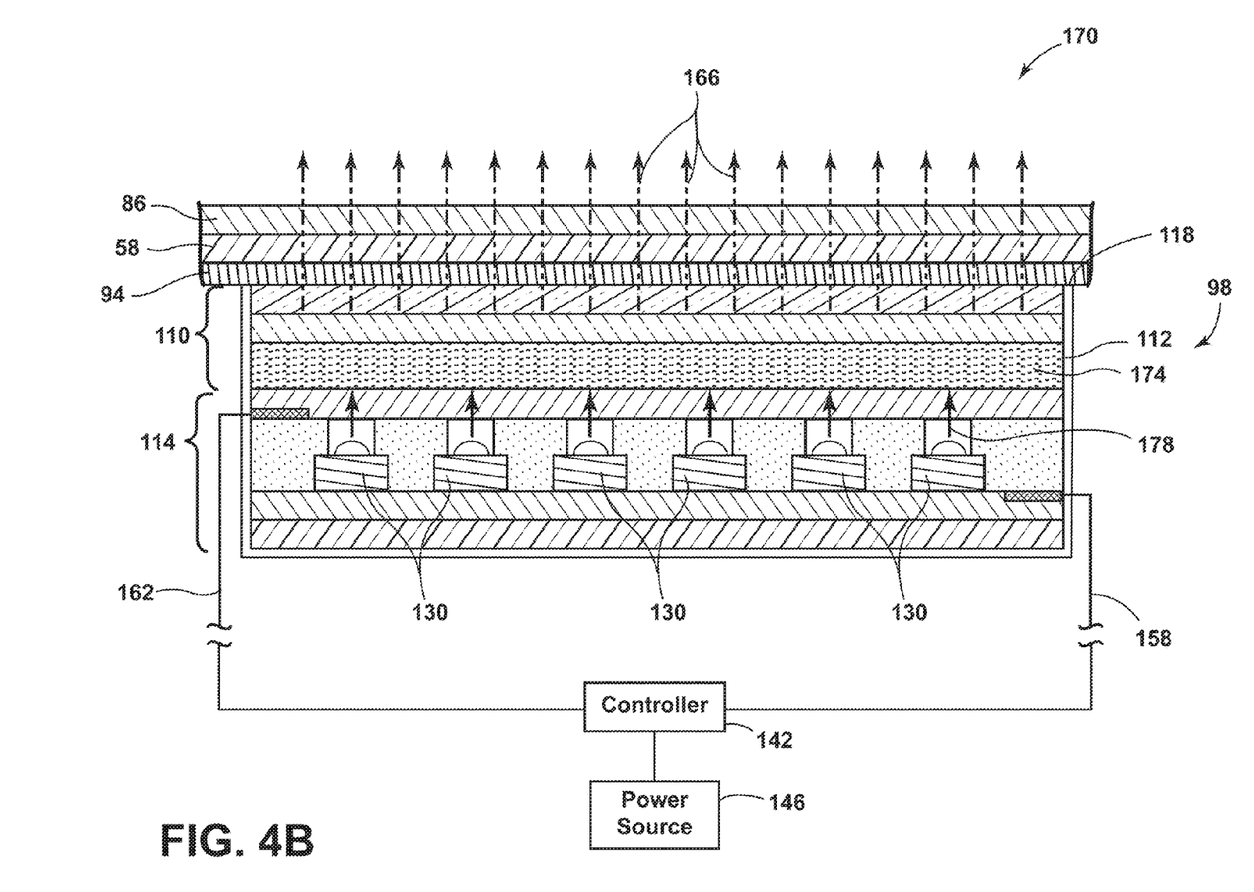
FIG. 4B is an enlarged cross-sectional view taken at section IV of FIG. 3 further illustrating the light assembly, according to one embodiment.

Referring now to FIG. 4B, the energy conversion process 170 for producing single color luminescence is illustrated, according to one embodiment. For purposes of illustration, the energy conversion process 170 is described below using the light assembly 98 depicted in FIG. 4A. In this embodiment, the energy conversion layer 112 of the photoluminescent structure 110 includes the single photoluminescent material 174, which is configured to convert inputted light 178 received from LED sources 130 into the outputted light 166 having a wavelength different than that associated with the inputted light 178. More specifically, the photoluminescent material 174 is formulated to have an absorption spectrum that includes the emission wavelength of the inputted light 178 supplied from the LED sources 130. The photoluminescent material 174 is also formulated to have a Stokes shift resulting in the converted visible outputted light 166 having an emission spectrum expressed in a desired color, which may vary per lighting application. The converted visible outputted light 166 is outputted from the light assembly 98 via the decorative layer 58, thereby causing the decorative layer 58 to illuminate in the desired color. The illumination provided by the decorative layer 58 may offer a unique, substantially uniform, and/or attractive, viewing experience that may be difficult to duplicate through non-photoluminescent means.

Figure 4C:
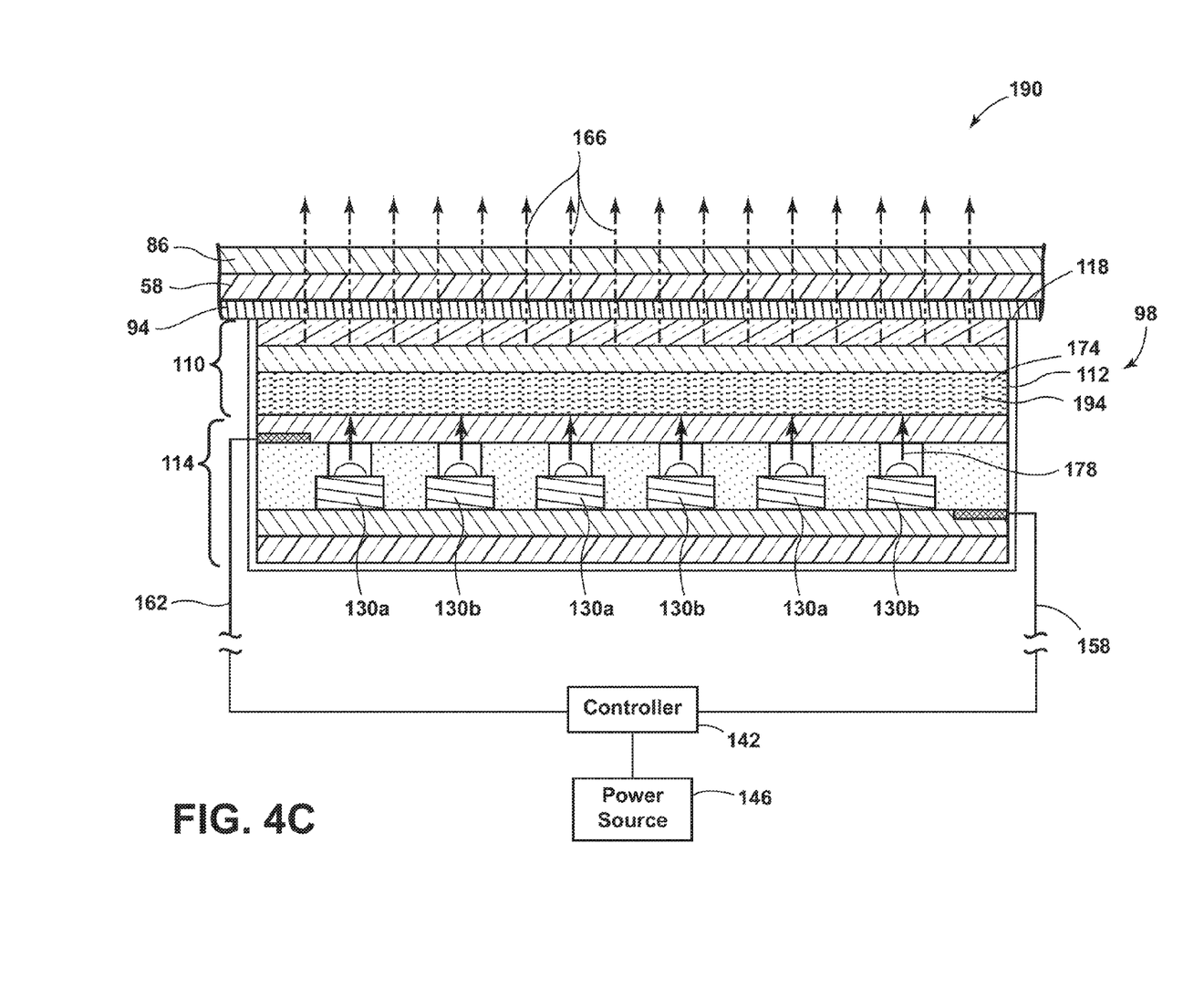
FIG. 4C is an enlarged cross-sectional view taken at section IV of FIG. 3 illustrating an alternate light assembly, according to one embodiment.

Referring to FIG. 4C, a second energy conversion process 190 for generating multiple colors of light is illustrated, according to one embodiment. For consistency, the second energy conversion process 190 is also described below using the light assembly 98 depicted in FIG. 4A. In this embodiment, the energy conversion layer 112 includes the first photoluminescent material 174 and a second photoluminescent material 194 that are interspersed within the energy conversion layer 112. Alternatively, the photoluminescent materials 174, 194 may be isolated from each other, if desired. Also, it should be appreciated that the energy conversion layer 112 may include more than two different photoluminescent materials 174 and 194, in which case, the teachings provided below similarly apply. In one embodiment, the second energy conversion process 190 occurs by way of down conversion using blue, violet, and/or UV light as the source of excitation.

With respect to the presently illustrated embodiment, the excitation of photoluminescent materials 174, 194 is mutually exclusive. That is, photoluminescent materials 174, 194 are formulated to have non-overlapping absorption spectrums and Stoke shifts that yield different emission spectrums. Also, in formulating the photoluminescent materials 174, 194, care should be taken in choosing the associated Stoke shifts such that the converted outputted light 166 emitted from one of the photoluminescent materials 174, 194, does not excite the other, unless so desired. According to one exemplary embodiment, a first portion of the LED sources 130, exemplarily shown as LED sources 130a, is configured to emit an inputted light 178 having an emission wavelength that only excites photoluminescent material 174 and results in the inputted light 178 being converted into a visible outputted light 166 of a first color (e.g., white). Likewise, a second portion of the LED sources 130, exemplarily shown as LED sources 130b, is configured to emit an inputted light 178 having an emission wavelength that only excites second photoluminescent material 194 and results in the inputted light 178 being converted into a visible outputted light 166 of a second color (e.g., red). Preferably, the first and second colors are visually distinguishable from one another. In this manner, LED sources 130a and 130b may be selectively activated using the controller 142 to cause the photoluminescent structure 110 to luminesce in a variety of designable colors. For example, the controller 142 may activate only LED sources 130a to exclusively excite photoluminescent material 174, resulting in the decorative layer 58 illuminating in the first color. Alternatively, the controller 142 may activate only LED sources 130b to exclusively excite the second photoluminescent material 194, resulting in the decorative layer 58 illuminating in the second color.

Alternatively still, the controller 142 may activate LED sources 130a and 130b in concert, which causes both of the photoluminescent materials 174, 194 to become excited, resulting in the decorative layer 58 illuminating in a third color, which is a color mixture of the first and second colors (e.g., pinkish). The intensities of the inputted light 178 emitted from each portion of the LED sources 130a, 130a may also be proportionally varied to one another such that additional colors may be obtained. For energy conversion layers 112 containing more than two distinct photoluminescent materials 174, a greater diversity of colors may be achieved. Contemplated colors include red, green, blue, and combinations thereof, including white, all of which may be achieved by selecting the appropriate photoluminescent materials 174 and correctly manipulating the corresponding LED sources 130.

Figure 4D:
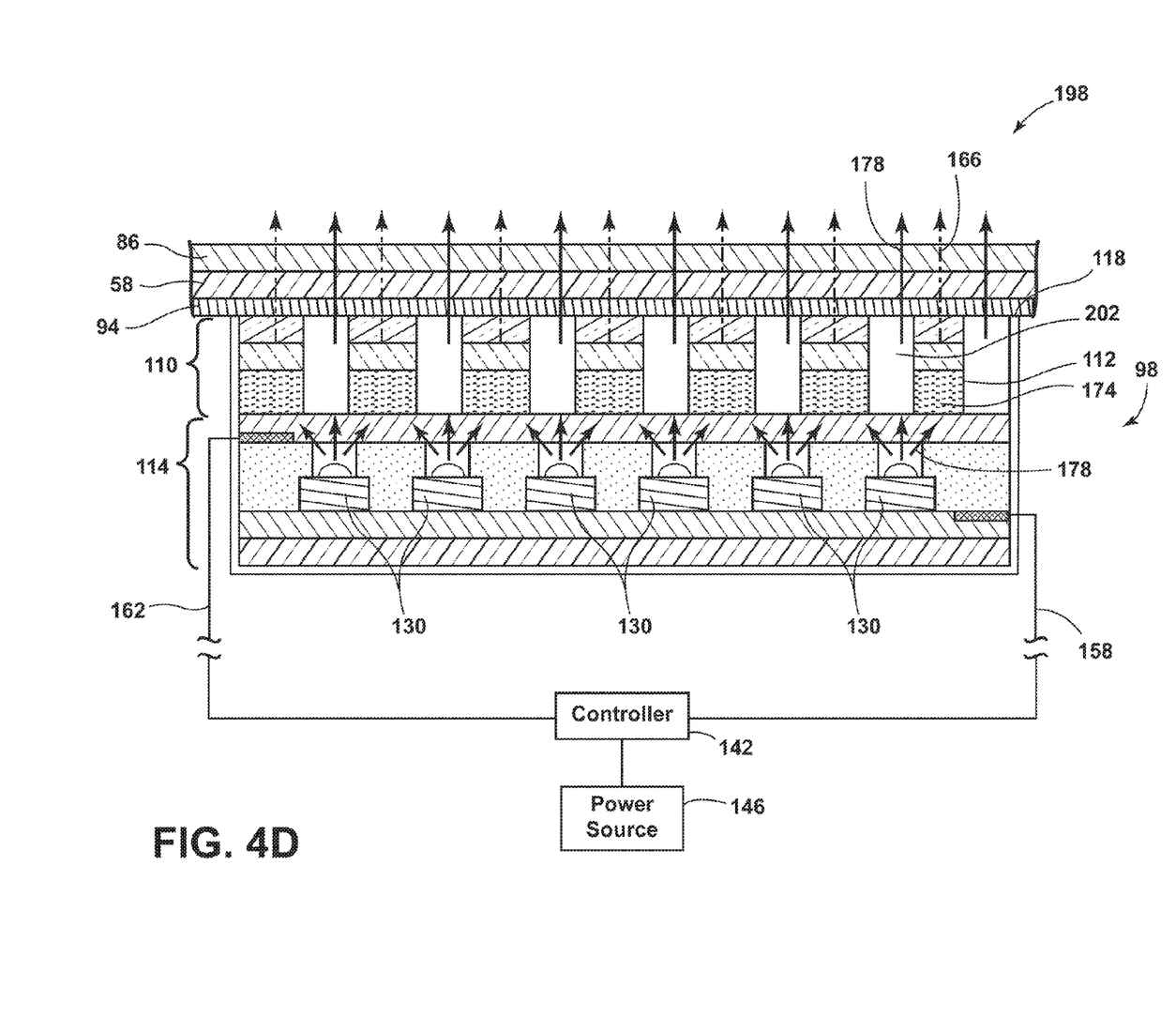
FIG. 4D is an enlarged cross-sectional view taken at section IV of FIG. 3 illustrating a light assembly having a luminescent structure separated by light transmissive portions disposed on the light source, according to another embodiment.

Referring to FIG. 4D, a third energy conversion process 198 includes a light-producing assembly 114, such as the one described in reference to FIG. 4A, and a photoluminescent structure 110 disposed thereon, according to an alternate embodiment. The photoluminescent structure 110 is configured to convert inputted light 178 received from LED sources 130 into a visible outputted light 166 having a wavelength different than that associated with the inputted light 178. More specifically, the photoluminescent structure 110 is formulated to have an absorption spectrum that includes the emission wavelength of the inputted light 178 supplied from the LED sources 130. The photoluminescent material 174 is also formulated to have a Stokes shift resulting in the converted visible outputted light 166 having an emission spectrum expressed in a desired color, which may vary per lighting application.

The photoluminescent structure 110 may be applied to a portion of the light-producing assembly 114, for example, in a stripped manner. Between the photoluminescent structures 110 may be light transmissive portions 202 that allow inputted light 178 emitted from the LED sources 130 to pass therethrough at the first wavelength. The light transmissive portions 202 may be an open space, or may be a transparent or translucent material. The inputted light 178 emitted through the light transmissive portions 202 may be directed from the light-producing assembly 114 towards the decorative layer 58 such that the decorative layer 58 may emit a colored light corresponding to the inputted light 178 that is directed through the light transmissive portions 202.

Figure 4E:
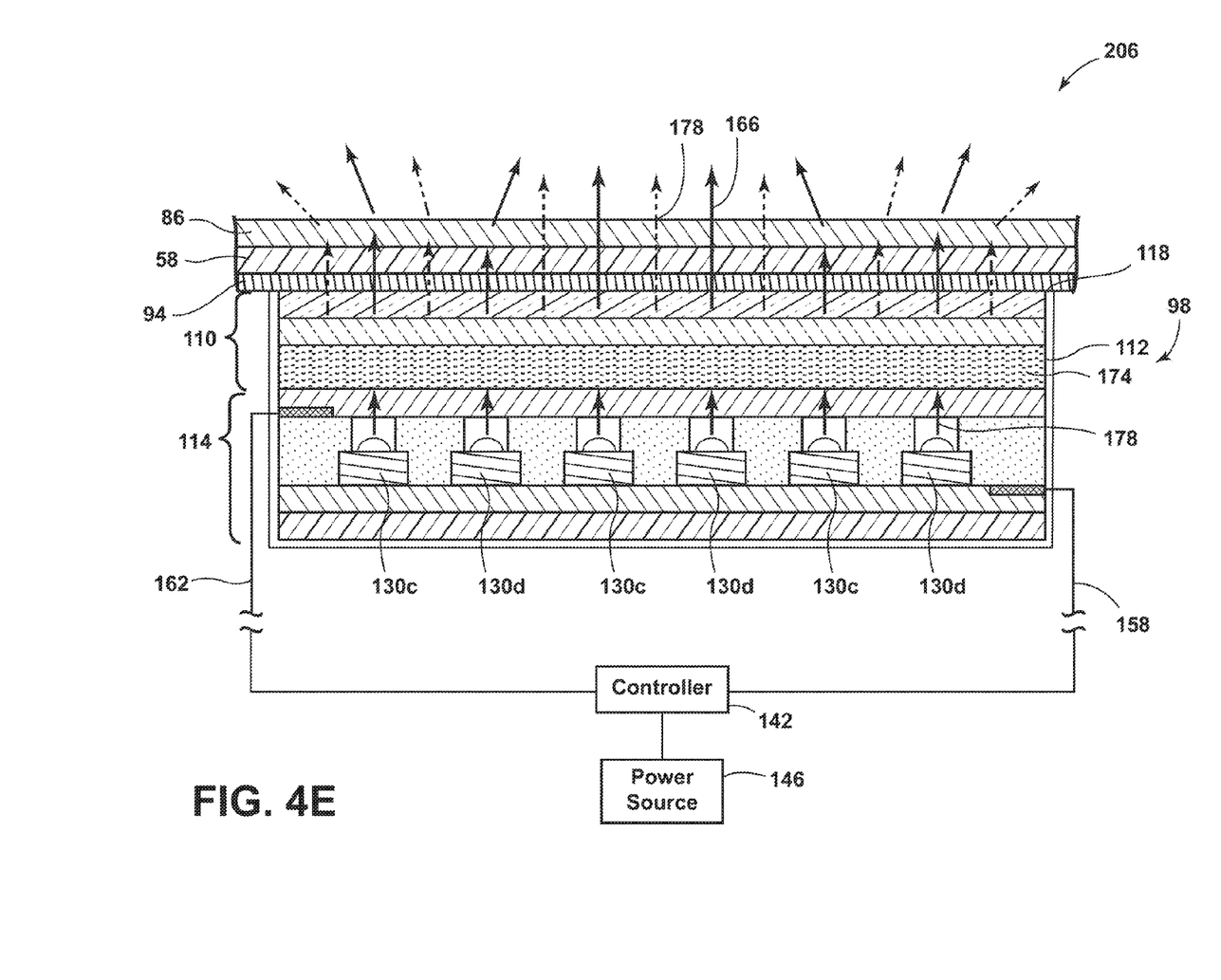
FIG. 4E is an enlarged cross-sectional view taken at section IV of FIG. 3 illustrating an alternate light source having a luminescent structure disposed on the light source configured to convert a portion of light emitted from the light source from a first wavelength to a second wavelength, according to one embodiment.

Referring to FIG. 4E, a fourth energy conversion process 206 for generating multiple colors of light utilizing the light-producing assembly 114, such as the one described in reference to FIG. 4A, and a photoluminescent structure 110 disposed thereon is illustrated. In this embodiment, the photoluminescent structure 110 is disposed over a top portion of the light-producing assembly 114. The excitation of photoluminescent material 174 is formulated such that a portion of inputted light 178 emitted from LED sources 130c, 130d passes through the photoluminescent structure 110 at the first wavelength (i.e., the inputted light 178 emitted from the light assembly 98 is not converted by the photoluminescent structure 110). The intensity of the emitted light (i.e., the combination of the inputted light 178 and outputted light 166) may be modified by pulse-width modulation or current control to vary the amount of inputted light 178 emitted from the LED sources 130c, 130d that pass through the photoluminescent structure 110 without converting to a second, outputted light 166 wavelength. For example, if the light assembly 98 is configured to emit inputted light 178 at a low level, substantially, all of the inputted light 178 may be converted to outputted light 166. In this configuration, a color of outputted light 166 corresponding to the photoluminescent structure 110 may be emitted from the light-producing assembly 114. If the light assembly 98 is configured to emit inputted light 178 at a high level, only a portion of the first wavelength may be converted by the photoluminescent structure 110. In this configuration, a first portion of the emitted light may be converted by the photoluminescent structure 110 and a second portion of the emitted light may be emitted from the light-producing assembly 114 at the first wavelength towards additional photoluminescent structures disposed proximately to the light assembly 98. The additional photoluminescent structures may luminesce in response to the inputted light 178 emitted from the light assembly 98.

According to one exemplary embodiment, a first portion of the LED sources 130, exemplarily shown as LED sources 130c, is configured to emit an inputted light 178 having a wavelength that excites the photoluminescent material 174 within the photoluminescent structure 110 and results in the inputted light 178 being converted into a visible outputted light 166 of a first color (e.g., white). Likewise, a second portion of the LED sources 130, exemplarily shown as LED sources 130d, are configured to emit an inputted light 178 having a wavelength that passes through the photoluminescent structure 110 and excites additional photoluminescent structures disposed proximately to the quarter window 42, thereby illuminating in a second color. The first and second colors may be visually distinguishable from one another. In this manner, LED sources 130c and 130d may be selectively activated using the controller 142 to cause the decorative layer 58 to luminesce in a variety of colors.

Figure 5:
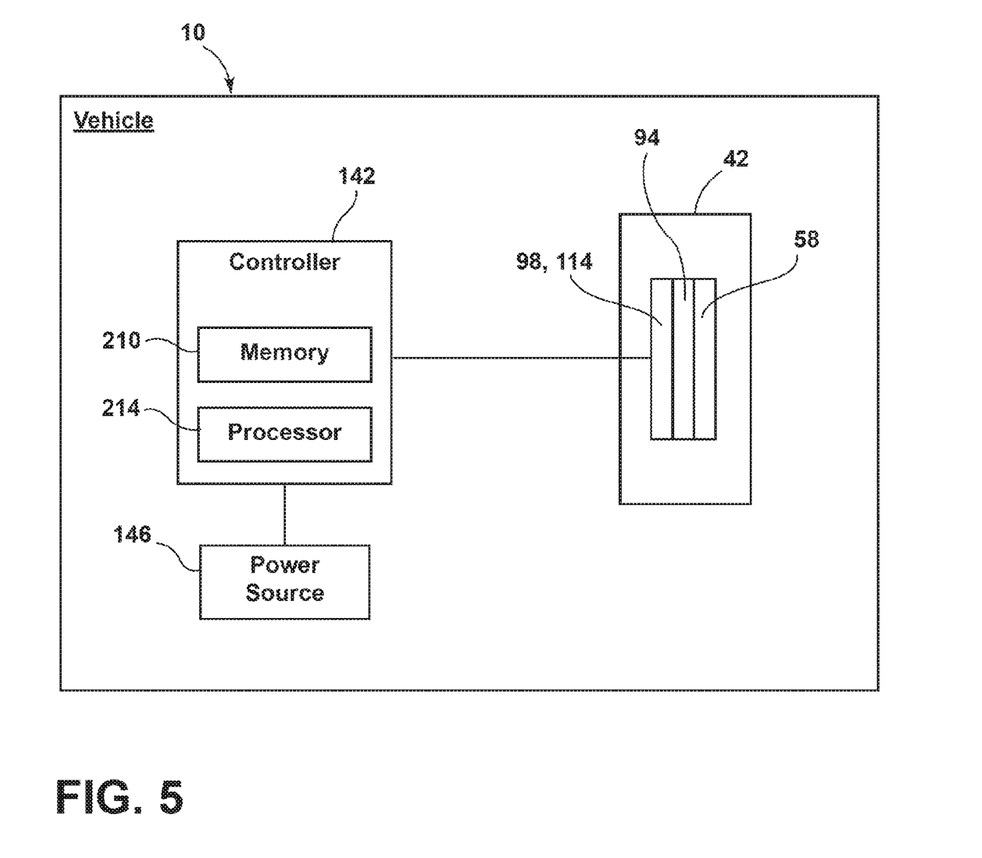
FIG. 5 is a block diagram of the vehicle and the lighting system.

Referring now to FIG. 5, a block diagram of the vehicle 10 is shown in which the decorative layer 58 is positioned within the quarter window 42. The vehicle 10 includes the controller 142 in communication with the light-producing assembly 114. The controller 142 may include a memory 210 having instructions contained therein that are executed by a processor 214 of the controller 142. The controller 142 may provide electrical power to the light-producing assembly 114 via the power source 146 located onboard the vehicle 10. In addition, the controller 142 may be configured to control the light output of the light-producing assembly 114 based on feedback received from one or more vehicle control modules. The controller 142 may be configured to operate the LED sources 130 (FIGS. 4A-4E), the first portion of LEDs 130a and/or the second portion of LEDs 130b separately and/or in an alternating manner (e.g., via current direction manipulation) in order to achieve a specific lighting appearance for the quarter window 42. For example, one or more of the LED sources 130, the first portion of LEDs 130a and/or the second portion of LEDs 130b may be configured to activate the phosphorescent layer 94. In some embodiments, the light-producing assembly 114 may be operated such that portions of the light-producing assembly 114 are activated and other portions are not such that the decorative layer 58 appears to be multicolored, has a pulsing effect, a specific feature (e.g., the indicia 62) is/isn't illuminated (i.e., or is a different color than the flat portion 66) and/or has a gradient to the color or intensity of light. By activating the light-producing assembly 114, the color of the illumination from the decorative layer 58 may change from a first color to a second color. The change in color of the decorative layer 58 may serve to communicate information (e.g., speed, transmission state, occupancy, indicate a turn), provide aesthetic lighting (e.g., pulse with music, provide warm ambient lighting, pulse with a sensed heartbeat) or to provide large area ambient illumination to an exterior of the vehicle 10. Further, the controller 142 may be configured to pulse the light-producing assembly 114 such that the phosphorescent structure 94 may keep a predetermined level of charge and luminance.

Use of the vehicle window glazing set forth in the present disclosure may allow several advantages. First, use of polymeric materials as the window substrate 74 may allow for the formation of the quarter glass 42 in a variety of shapes. For example, due to the ease at which polymeric materials may be formed, relative to glass, the quarter windows 42 may take a variety of complex shapes (e.g., curves, undulations, etc.) which may be unattainable by glasses. Second, use of polymeric materials as the window substrate 74 may allow for decreased thermal transfer of energy across the quarter glass 42. Such a decrease in thermal transfer across the quarter glass 42 of the vehicle 10 may allow for an increase in HVAC efficiency (e.g., which may allow for an increase in fuel efficiency). Third, use of a less dense material (e.g., polymeric materials) for the quarter window 42 instead of denser materials (e.g., glass) may lead to a weight savings (e.g., upwards of 50% compared to glass) in the vehicle 10 which may allow for an overall fuel efficiency increase for the vehicle 10. Fourth, use of a polymeric material as the window substrate 74 of the quarter window 42 may allow for coloring of the quarter window 42. For example, dyes, pigments, tints, and other colorings may be added to the window substrate 42 and/or the first and second polymeric layers 86, 90 to color the quarter window 42 in an aesthetically pleasing manner. Fifth, use of the first and second polymeric layers 86, 90 may allow for a better seal of the decorative layer 58 and/or the light assembly 98. Increased sealing of the quarter window 42 may be advantageous in preventing penetration of moisture which may cause clouding, hazing or degradation of the decorative layer 58 and/or the light assembly 98.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A vehicle window glazing, comprising:
   a transparent substrate of a vehicle window defining a first surface;
   a decorative layer positioned on the first surface defining an indicium;
   a light source positioned on the decorative layer;
   at least one substantially transparent conductive lead electrically coupled to the light source and extending along the first surface of the substrate away from the light source; and
   a transparent layer positioned over the decorative layer and the substrate.

2. The vehicle window glazing of claim 1, further comprising:
   an adhesive layer positioned between the first surface of the substrate and the decorative layer.

3. The vehicle window glazing of claim 1, wherein a portion of the decorative layer is translucent.

4. The vehicle window glazing of claim 1, further comprising:
   a photoluminescent layer positioned on the decorative layer.

5. The vehicle window glazing of claim 1, wherein the light source is a printed light emitting diode and is positioned between the decorative layer and the first surface of the substrate.

6. The vehicle window glazing of claim 5, wherein the conductive lead comprises indium tin oxide.

7. The vehicle window glazing of claim 6, wherein the light source is configured to illuminate the indicium of the decorative layer.

8. The vehicle window glazing of claim 7, wherein the transparent layer comprises silicone.

9. A vehicle window glazing, comprising:
   a substantially transparent substrate of a vehicle window defining first and second surfaces;
   a decorative layer positioned on the first surface defining an indicium which is raised relative to the decorative layer;
   a first silicone layer positioned over the decorative layer and the first surface of the substrate, wherein a light source is disposed within the first silicone layer for illuminating the decorative layer; and
   a second silicone layer positioned over the second surface.

10. The vehicle window glazing of claim 9, wherein the first and second silicone layers are configured to reduce audio power transfer through the vehicle window glazing by greater than 5 dB.

11. The vehicle window glazing of claim 10, wherein the first and second silicone layers are configured to reduce audio power transfer through the vehicle window glazing by greater than 10 dB.

12. The vehicle window glazing of claim 9, wherein the first and second silicone layers have a thickness in a range of 0.25 mm to 0.5 mm.

13. The vehicle window glazing of claim 12, wherein the substantially transparent substrate has a thickness in a range of 1.0 mm and 7.0 mm.

14. A vehicle window glazing, comprising:
   a substantially transparent substrate of a vehicle window defining a first surface;
   a decorative layer positioned on the first surface, the decorative layer defining an indicium which is raised relative to the decorative layer;
   a phosphorescent layer positioned between the decorative layer and the substrate; and
   a substantially transparent conductive lead electrically coupled to a light source and extending along the first surface away from the light source.

15. The vehicle window glazing of claim 14, further comprising a first transparent polymeric layer which extends over the decorative layer and the first surface of the substantially transparent substrate.

16. The vehicle window glazing of claim 15, further comprising:
   the light source configured to emit light through the decorative layer.

17. The vehicle window glazing of claim 16, wherein the first transparent polymeric layer comprises silicone.

18. The vehicle window glazing of claim 17, wherein the decorative layer comprises a metallic foil.

19. The vehicle window glazing of claim 18, wherein the decorative layer defines an indicium which is raised relative to the decorative layer.

20. The vehicle window glazing of claim 19, further comprising:
   a second transparent polymeric layer positioned on a second surface of the substrate.

* * * * *